J. OLIVER.

Casting Mold-Boards.

No. 5,801. Reissued March 17, 1874.

WITNESSES.
P. C. Dieterich.
H. C. Fox

INVENTOR,
James Oliver
per C. H. Watson & Co.
ATTORNEYS

AM. PHOTO-LITHOGRAPHIC Co. N. Y. (OSBORNE'S PROCESS.)

UNITED STATES PATENT OFFICE.

JAMES OLIVER, OF SOUTH BEND, INDIANA.

IMPROVEMENT IN CASTING MOLD-BOARDS.

Specification forming part of Letters Patent No. 76,939, dated April 21, 1868; reissue No. 5,801, dated March 17, 1874; application filed February 3, 1874.

*To all whom it may concern:*

Be it known that I, JAMES OLIVER, of South Bend, in the county of St. Joseph and State of Indiana, have invented certain new and useful Improvements in Casting Mold-Boards for Plows, by means of which all danger of rending or cracking is avoided, thus producing a very durable and cheap article of that description; and it consists in providing the upper part of the flask with a so-called chill, provided with any desired number of recesses for holding cores, and also in providing a chill with a face corresponding in form to the shape of the mold-board to be cast, the back of the chill forming a pan, the entire surface of which is open, as hereinafter more fully described. And I do hereby declare that the following is a full, clear, and exact description thereof, which will enable others skilled in the art to which it appertains to make and use the same, reference being had to the accompanying drawing, with letters of reference marked thereon, forming a part of this specification, in which—

Figure 1:
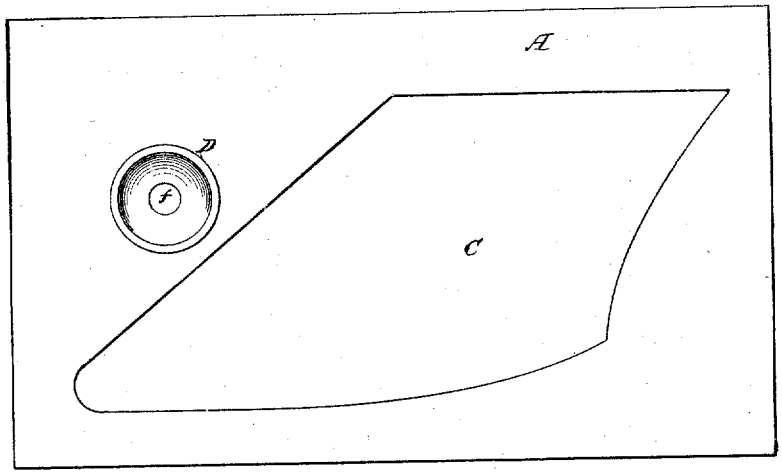
Figure 2:
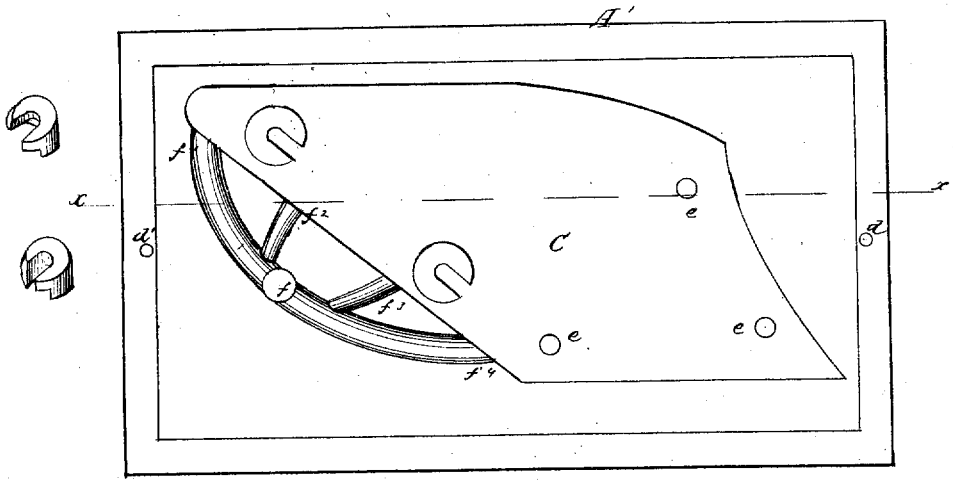
Figure 3:
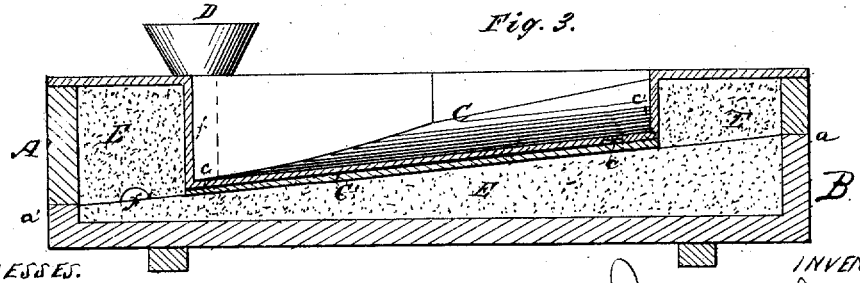

Figure 1 represents a plan view of the flask. Fig. 2 represents a bottom view of the cope, and Fig. 3 represents a longitudinal section of the cope and drag.

A represents the top of the cope, constructed of metal, and attached to the ends and sides of the frame A′. The top is provided with a funnel, D, having an opening, *f*, leading to the gate. C represents the open pan or chamber formed in the metal top A, the bottom of the chamber extending nearly to the bottom of the flask. The lower or outside of the pan or chamber forms the chill, and is constructed to conform to the shape of the mold-board to be cast, and provided with recesses or core-seats *e e*, for firmly holding the ends of the cores, which make the necessary number of bolt-holes in the mold-board, thus making the position of the bolt-holes uniform in all the mold-boards cast in this manner. When the flask is in a horizontal position, the bottom of the pan or chamber is upon an incline from the funnel D, as shown in Fig. 3, for a purpose presently described. B represents the drag, the upper part of which is on an incline to correspond to the lower parts of the cope, (represented by line from *a* to *a′* in Fig. 3,) the cope and drag being held in position by pins and corresponding recesses *d d′*. The space E, in both cope and drag, is filled with sand and rammed, in the usual manner, and in which is formed the opening *f* in funnel D, leading to the gate $f^1$, $f^2$, $f^3$, and $f^4$, said gate being formed in the several branches to allow an equal supply of hot metal across the entire breadth of the mold-board. C represents the pattern resting upon the face of the chill.

Lugs are cast upon the mold-board for the purpose of attaching the plow-handles.

After the molder has performed his work in the usual manner, the end of the flask having the funnel D is elevated or raised to slightly incline the bottom of the pan in an opposite direction, and the pan filled with hot water to absorb the dampness arising from the sand in the mold, and upon the face of the chill. The molten metal is then poured in at D, passing, through the opening *f* and the gate, into the lower space *e*, gradually rising to *e′*, until the space is full, while the steam and gas arising from the metal, coming in contact with the sand, are allowed to escape, as the part of the mold farthest from the funnel is filled first. At the same time, during the operation of casting, the pan *c*, having so large open surface, allows the water to steam off rapidly, thereby the more rapidly absorbing the heat in the chill, thus keeping up the chilling properties of the chill in a moderate manner. When the castings are removed from the flask, they are packed close together in sand, for the purpose of retaining the heat, and allowing a gradual cooling to prevent them from being injured.

Having thus fully described my invention, what I claim, and desire to secure by Letters Patent, is—

1. The chambered chill C, its bottom constructed to conform to the shape of the mold-board, the chamber being open its entire length parallel with the face of the chill, to allow the water to steam off rapidly, for the purpose specified.

2. A chill provided with core-seats *e e*, substantially as and for the purpose herein described.

In testimony that I claim the foregoing, I hereunto set my hand.

JAMES OLIVER.

Witnesses:
C. H. WATSON,
H. C. SCOTT.